(12) United States Patent
Byers et al.

(10) Patent No.: US 7,377,972 B2
(45) Date of Patent: May 27, 2008

(54) COSOLVENTS IN PRINTING FLUIDS

(75) Inventors: Gary W Byers, Vista, CA (US); Richard Anderson, Escondido, CA (US); Mark L. Choy, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 10/951,411

(22) Filed: Sep. 27, 2004

(65) Prior Publication Data

US 2006/0065155 A1 Mar. 30, 2006

(51) Int. Cl.
*C09D 11/02* (2006.01)
*B41J 2/01* (2006.01)
*B05D 3/02* (2006.01)

(52) U.S. Cl. .............. 106/31.43; 106/31.46; 106/31.47; 106/31.49; 106/31.75; 106/31.76; 106/31.77; 106/31.78; 347/100; 427/372.2

(58) Field of Classification Search ........... 106/31.43, 106/31.75, 31.46, 31.47, 31.49, 31.76, 31.77, 106/31.78; 347/100; 427/372.2
See application file for complete search history.

(56) References Cited

U.S. PATENT DOCUMENTS

| | | | |
|---|---|---|---|
| 3,447,939 A | | 6/1969 | Johnson |
| 5,500,668 A | * | 3/1996 | Malhotra et al. ........... 347/105 |
| 5,554,739 A | | 9/1996 | Belmont |
| 5,757,408 A | * | 5/1998 | Malhotra ................ 347/105 |
| 5,785,745 A | * | 7/1998 | Lauw et al. ............. 106/31.27 |
| 5,891,232 A | * | 4/1999 | Moffatt et al. ........... 106/31.89 |
| 5,919,293 A | | 7/1999 | Moffatt et al. |
| 5,935,309 A | * | 8/1999 | Moffatt et al. ........... 106/31.27 |
| 5,938,827 A | * | 8/1999 | Breton et al. ............ 106/31.43 |
| 5,997,623 A | * | 12/1999 | Lin ........................ 106/31.58 |
| 6,451,098 B1 | | 9/2002 | Lye et al. |
| 2003/0020796 A1 | | 1/2003 | Stroffel et al. |
| 2003/0101903 A1 | | 6/2003 | Lye et al. |
| 2006/0233975 A1 | * | 10/2006 | Tran et al. ................ 428/32.3 |

FOREIGN PATENT DOCUMENTS

| | | |
|---|---|---|
| EP | 0 559 324 A | 9/1993 |
| EP | 0 657 235 A | 10/1993 |
| EP | 0 885 940 A | 12/1998 |
| HU | 27691 | 10/1983 |
| HU | 37951 | 3/1986 |
| HU | 77809 | 8/1998 |
| WO | WO9618694 | 6/1996 |
| WO | WO 02/31067 | 4/2002 |

OTHER PUBLICATIONS

HU Search report dated Aug. 2, 2007.

\* cited by examiner

*Primary Examiner*—Helene Klemanski

(57) ABSTRACT

An aqueous printing fluid, comprising a cosolvent, the cosolvent or mixture of compounds comprising at least one inner salt compound having a $sp^3$-hybridized nitrogen cation and an associated anionic charge either isolated on an N-substituted oxygen anion bound directly to the $sp^3$-hybridized nitrogen cation or isolated among the oxygens of a carboxylate group; a method of avoiding paper curl in printed paper by using the above-described aqueous printing fluid; and a printer system for avoiding paper curl in printed paper through using the above-described aqueous printing fluid.

42 Claims, No Drawings

COSOLVENTS IN PRINTING FLUIDS

FIELD OF THE INVENTION

The present invention relates to cosolvents used in aqueous inks and fixers, the cosolvents imparting anti-curl qualities to both the inks and fixers.

BACKGROUND OF THE INVENTION

Curl and cockle of cellulose-based papers are persistent problems in inkjet printing with water-based inks. The problem stems from dimensional changes in the paper when it is wetted (especially when it is wetted on only one side) and then dried. In normal plain paper, dimensional stability is a function of the presence of cellulose fibers which are usually a couple of millimeters long. These bind together by fiber-to-fiber associations, which are dominated by intermolecular H-bonds.

When these fiber-to-fiber H-bonds are disrupted or broken, changes in paper physical integrity are brought about. This breaking can be brought about by exposure to elevated temperatures, H-bonding solvents (including water) and/or moisture/humidity.

When aqueous fluid (ink/fixer) is applied to paper, it first accumulates in the paper's capillary spaces. Water and other hydrophilic components of the fluid wet the surfaces of the fibers. This water and/or organic cosolvent breaks the fiber-to-fiber H-bond associations and noticeably reduces the paper's dimensional integrity. Solvents that are particularly good at breaking the surface fiber-to-fiber interactions include water, dimethyl sulfoxide (DMSO), formamide, dimethyl formamide (DMF), ethylene glycol, glycerol, morpholine and pyridine.

With continued exposure of the aqueous-cosolvent fluid to the fibers in the paper, the water and hydrophilic solvents penetrate into the amorphous regions of the cellulose and cause the fibers to swell.

With wetting, the cellulose fiber-to-fiber associations (H-bonds) are disrupted by water and as the fibers swell with water, they increase in size, which relocates the original sites for fiber-to-fiber associations. As the fibers begin to dry from the outside inward, their fiber-to-fiber H-bonds tend to reestablish as surface moisture is lost. As the fibers continue drying out, they shrink from their swollen state, and with the surface fiber-to-fiber associations reestablished, stress/strain develops. This stress/strain is observed as curl across the page.

SUMMARY OF THE INVENTION

One embodiment of this disclosure includes an aqueous printing fluid comprising at least one anti-curl cosolvent, wherein the at least one anti-curl cosolvent comprises at least one inner salt compound having a $sp^3$-hybridized nitrogen cation and an associated anionic charge either isolated on an N-substituted oxygen anion (oxygen anion bound directly to the $sp^3$-hybridized nitrogen cation) or isolated among the oxygens of a carboxylate group.

Another embodiment includes a method of avoiding paper curl in printed paper comprising:

a) preparing an aqueous printing fluid comprising at least one anti-curl cosolvent, wherein the at least one anti-curl cosolvent comprises at least one inner salt compound having a $sp^3$-hybridized nitrogen cation and an associated anionic charge either isolated on an N-substituted oxygen anion (oxygen anion bound directly to the $sp^3$-hybridized nitrogen cation) or isolated among the oxygens of a carboxylate group;

b) printing the paper with the aqueous printing fluid; and c) drying the aqueous printing fluid onto the paper.

In addition, another embodiment includes a printer system for avoiding paper curl in printed paper comprising:

an aqueous printing fluid-depositing system including an aqueous printing fluid comprising at least one anti-curl cosolvent, wherein the at least one anti-curl cosolvent comprises at least one inner salt compound having a $sp^3$-hybridized nitrogen cation and an associated anionic charge either isolated on an N-substituted oxygen anion (oxygen anion bound directly to the $sp^3$-hybridized nitrogen cation) or isolated among the oxygens of a carboxylate group, wherein the aqueous printing fluid is deposited onto paper and the deposited aqueous printing fluid is dried onto the paper.

DETAILED DESCRIPTION OF EMBODIMENTS OF THE INVENTION

The present application relates to the problem of "curl" that results when cellulose-based media is inkjet printed with aqueous fluid. The present application describes employing "anti-curl" cosolvents that persist on the fiber surface and disrupt the fiber-to-fiber associations until the paper has dried and the state of swell of the cellulose has stabilized/equilibrated.

Inkjet or other aqueous applications of fluid with either dyes, pigments or fixer on plain paper normally induces curl in the paper, depending upon the amount of fluid deposited on the paper, i.e. the amount per unit area of aqueous ink deposited on the paper. In a similar way, inkjet or other aqueous application of fixer on plain paper also induces curl. This apparently occurs because when the evaporating water of the aqueous fluid leaves the swollen cellulose fiber surfaces of the substrate, shrinkage and stress-buildup of the fibers occurs, especially if the fibers are pinned closely together in their swollen configuration prior to complete reduction in the state of fiber swell.

An anti-curl agent can reduce the tendency of the imaged paper to curl as the aqueous deposit dries. An anti-curl agent appears to suppress the reformation of cellulose surface fiber-to-fiber H-bonding associations during the water drying process of a printed substrate. As set out in the present application, cosolvents have been found, for use as components of aqueous ink/aqueous fixer printing vehicles, that are effective anti-curl agents. All the cosolvents that are used in the present invention as anti-curl agents were selected to be disruptive to fiber-to-fiber H-bonds in cellulose-based media, i.e., to be H-bond accepting and/or H-bond donating solvents. Solvents as described above, such as water, have the capability to participate in an H-bond association in competition with the cellulose-cellulose H-bond associations. Such solvent powers of H-bond associations are quantitated in terms of H-bond accepting and H-bond donating. The H-bonds are asymmetric with a typical bond shown below with the C=O end being the acceptor and the RO—H being the donor:

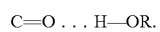

C=O . . . H—OR.

For further explanation of H-bonding and its quantitation see: Progress in Physical Organic Chemistry, Vol. 13, R. W. Taft, ed., John Wiley, NY (1981), "An Examination of Linear Solvation Energy Relationships" M. J. Kamlet, J. L. M. Abboud, and R. W. Taft, page 485; M. J. Kamlet, J. L. M. Abboud, M. H. Abraham, and R. W. Taft, J. Org. Chem., Vol. 48, p2877-2887 (1983) "Linear Solvation Energy Relationships. 23. A Comprehensive Collection of the Solvatochromic Parameters, $\pi^*$, $\alpha$, and $\beta$ and Some Methods for Simplifying the Generalized Equation."

Non-limiting examples of known typical solvents/functional groups with strong H-bond accepting capabilities include: water, alcohols, ethers, amines, amides, carbonyl groups, sulfoxides, sulfones, phosphine oxides, etc. By the same token, non-limiting examples of typical solvents/functional groups with strong H-bond donating capabilities include: water, alcohols, protonated amines, primary and secondary amines, primary and secondary amides, etc.

In a preferred embodiment, the cosolvents used in the present invention also have low neat solvent vapor pressures, "neat solvent" being defined as an essentially pure, undiluted form of the solvent. Their anti-curl qualities appear to at least partially occur because their non-volatile character means they persist on the surface of the cellulose fibers during drying and continue to disrupt the fiber-to-fiber bonding until the excess water has evaporated and the fiber swell has stabilized.

In a preferred group of these anti-curl agents, the cosolvent compounds all contain an inner salt. These inner salt-containing compounds are neutral compounds which have formal unit electrical charges of opposite sign. The inner-salt-containing compounds have relatively localized charges which are not part of an electronically conjugated system except in the case of conjugation between the oxygens within carboxylate groups. Specifically these compounds have a $sp^3$-hybridized nitrogen cation, which cannot delocalize charge into a conjugated Pi electronic system, and an associated anionic charge either isolated on an N-substituted oxygen anion (oxygen anion bound directly to the cationic nitrogen) or isolated among the oxygens of a carboxylate group.

The following constitute a detailed explanation and non-limiting examples of what fall inside and outside of the above definition of "inner salt. The first example is a solvatochromic indicator dye referred to in the literature as a "Dimroth and Reichardt's Betaine" and the second is the actual molecule "Betaine" as used in the present application. The third is Glycine which is representative of the amino acids. Amino acids at commonly used printing pHs are "isoelectronic", i.e., a proton transfer occurs from the acid moiety to the amine moiety to yield an internal salt. In these materials/inner salts, the desirable "good" materials have a $sp^3$-hybridized nitrogen cation that is not delocalized into a conjugated Pi electronic system, which means that the cationic charge is localized on the Nitrogen. The associated anionic charge is either isolated on an N-substituted oxygen anion (oxygen anion bound directly to the cationic nitrogen) or isolated among the oxygens of the carboxylate group.

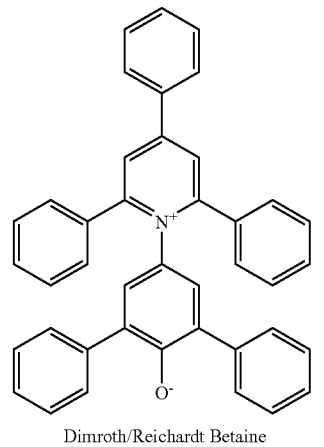

Dimroth/Reichardt Betaine

Bad
(charges delocalized into Pi system)

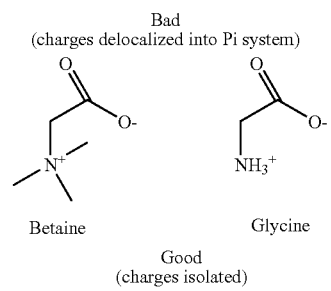

Betaine          Glycine

Good
(charges isolated)

In the "Dimroth and Reichardt Betaine", the nitrogen cation is $sp^2$-hybridized with the cationic charge delocalized within the dye. Similarly, the oxygen anion in this dye is not isolated on a sp3 nitrogen cation or located in a carboxylate group. Clearly, the "Dimroth/Reichardt Betaine" does not meet the necessary criteria. However, Betaine and the amino acid internal salts represented by Glycine meet both criteria of a) a $sp^3$ nitrogen cation and b) an associated carboxylate anion.

In addition, ammonium-N-Oxides are shown below which fall inside and outside of the definition given above. The first one shown, pyridinium-N-oxide, has an $sp^2$ nitrogen cation and when tested, was found to be a poor anti-curl solvent. The second, azoxybenzene, is an "oxidized dye" which also has an $sp^2$ nitrogen cation. Azoxybene and pyridinium-N-oxide also have oxyanions that are part of a conjugated electronic system with expected anionic charge delocalization. Azoxybenzene, like the "Dimroth/Reichardt Betaine indicator dye", is not useful as an anti-curl solvent because it is not polar enough. These materials with $sp^2$-hybridized nitrogen cations and oxyanions with delocalized charge are to be distinguished from the generalized structure of ammonium-N-oxide materials, (the third structure shown below), which has an $sp^3$-hybridized nitrogen cation and an oxyanion with localized charge occurring in the "good" materials. The materials having this structure are useful and effective as anti-curl solvents.

In the case of these ammonium-N-Oxide materials, the desirable "good" example has a $sp^3$-hybridized nitrogen cation that is not part of a conjugated Pi electronic system and the cationic charge is isolated on the Nitrogen. Similarly in the "good" example, the anionic charge on the oxygen is isolated to the oxygen, since the adjacent Nitrogen is fully saturated. In contrast, in the undesirable "bad" examples, the azoxybenzene and the pyridinium-N-oxide, the Nitrogens in them are sp²-hybridized and part of conjugated Pi electron systems, where the cationic charge is delocalized throughout the structure. Furthermore, the fact that the adjacent atom (Nitrogen) is sp²-hybridized allows the oxyanion to conjugate/delocalize into the extended Pi systems.

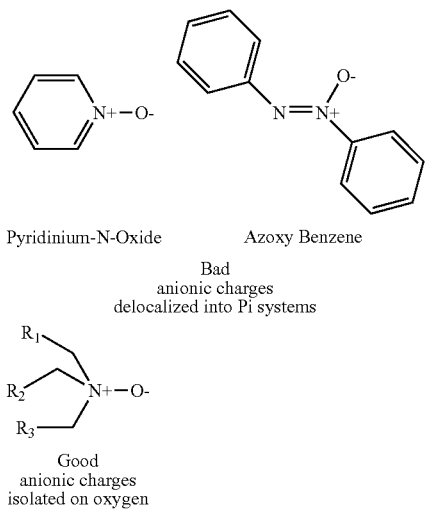

Pyridinium-N-Oxide    Azoxy Benzene
Bad
anionic charges
delocalized into Pi systems Good
anionic charges
isolated on oxygen Non-limiting examples of inner salts which function well as anti-curl agents include ammonium-N-oxide moieties, betaines and amino acids. Besides acting as anticurl agents, the oxyanions (for example, the oxide oxygen of ammonium-N-oxides and a carboxylate oxygen in some amino acids) can act as conjugate bases for formation of weak acid buffers. These cosolvents in the presence of a strong acid, can also act as a buffer to provide substantial acid capacity in the presence of a strong acid, which is useful in fixers. This dual function can reduce the chemical loading in fixer formulations.

Ammonium-N-oxide moieties are a preferred group of the inner salts. Non-limiting examples of ammonium-N-oxide moieties are: N-MethylMorpholine-N-Oxide (MMNO); N-EthylMorpholine-N-Oxide (EMNO); N,N-DiMethylButylAmmonium-N-Oxide (DMBANO) and N,N,N-TriMethylAmmonium-N-Oxide (TMANO). Ammonium-N-oxide moieties have an oxygen anion and three alkyl groups attached to a cationic nitrogen, and each alkyl group independently comprises up to 6 carbons. Furthermore, each alkyl group is either straight-chained or branched, or, alternatively, multiple alkyl groups connected to the nitrogen may be combined together to form (a) 5 to 7-membered ring(s) comprising at least 4 carbons. Furthermore, the 5 to 7-membered ring may further comprise at least one hetero atom selected from the group consisting of nitrogen or oxygen. Additionally, the alkyl groups may be substituted with or have attached to them groups such as water solubilizing moieties. For example, one or more of the carbons in a 5 or 6-membered ring can be substituted with an oxygen atom, such as the ether group in a morpholine ring. Other examples might include the attachment, rather than the substitution, of water solubilizing group(s) to alkyl group(s), that are in either straight-chained, branched or 5 or 6-membered ring groups. As a non-limiting example, the at least one water-solubilizing moiety might be a hydroxyl group, a carbonyl group, an amide group, a sulfone group a sulfoxide group, a polyethylene glycol moiety, or even an additional ammonium-N-oxide.

Of the ammonium-N-oxide moieties, Trimethylammonium-N-oxide (TMANO) is most preferred as an anti-curl agent. It has been found to have the best anti-curl qualities on a weight for weight basis of any of the ammonium-N-oxide cosolvents examined.

MMNO and the other ammonium-N-oxide cosolvents have also been found to be useful in their conjugate acid form (protonation of the N-Oxide anion, a weak base, in the presence of a strong acid) for buffering and increasing acid capacity in fixer vehicle. The "buffer" is in fact a mixture of the ammonium-N-oxide with its protonated form which is accessible by lowering the pH of the aqueous solution of the ammonium-N-oxide cosolvent with a strong acid (such as non-limiting examples: HCl, Nitric acid or MethaneSulfonic Acid) that, in the case of N-MethylMorpholine-N-Oxide, protonates the MMN$^+$O$^-$ to form the acid MMN$^+$OH. Buffer capacity in the region of pH 4-5 is provided by ammonium-N-oxides which have conjugate acid pKa's (negative log acid dissociation constants) in the 4-5 region. This is the region that is best for maximizing safety and minimizing corrosion when the cosolvent is used in acidic fixers.

To maximize their anti-curl capabilities, any of the inner-salt-containing cosolvents or combination of the inner salt containing cosolvents of the present invention can be dissolved at levels of at least approximately 10% in an aqueous ink or fixer. Depending upon the formula weight of the inner salt cosolvent, 20-25 weight % is an optimum level of the cosolvent in an aqueous ink or fixer. With the exception of glycine, which has limited solubility, the cosolvents can also be used at levels above approximately 25 weight %.

Any of the inner-salt-containing cosolvents of the present invention can also be dissolved in combination with other conventional non-ionic, water-soluble blendcosolvents in an aqueous solution. The total amount of the blend of the inner-salt-containing cosolvents and the non-ionic, water-soluble blend cosolvents comprises at least approximately 10 weight % of the aqueous ink or fixer vehicle. In a preferred embodiment, these blend cosolvents should preferably be, in addition to non-ionic and water-soluble, H-bond accepting and/or H-bond donating. Such a combination of an inner-salt-containing cosolvent and blend cosolvent(s) can achieve anti-curl effects comparable to a similar concentration of the inner salts alone. In a more preferred embodiment, the non-ionic, water-soluble, H-bond accepting and/or H-bond donating, conventional cosolvent used should have a neat solvent vapor pressure of no more than $4 \times 10^{-2}$ mm Hg (at 25° C.). In a yet more preferred embodiment, the non-ionic, water-soluble, H-bond accepting and/or H-bond donating, conventional cosolvent used should have a neat solvent vapor pressure of no more than $1 \times 10^{-4}$ mm Hg (at 25° C.). In another preferred embodiment, the aqueous printing fluid comprises from 5 to 60% of the blended solution of the at least one inner-salt-containing cosolvent and the blend cosolvent(s) and the weight ratio in the blended solution of the inner-salt-containing cosolvent to blend cosolvent(s) ranges from 3:97 to 99:1.

Non-limiting examples of conventional cosolvents that can be blended with inner-salt-containing cosolvents are many aqueous cosolvents conventionally used in inkjet printing fluids. Such conventional aqueous cosolvents might include, among others, at least one of the following: dipropylene glycol, 1,2-hexanediol, 2-pyrrolidinone, diethylene glycol, sulfolane, 1,5-pentanediol, tetraglyme, triethylene glycol, 1,6-hexanediol, glycerol, trimethylolpropane (EHPD), and tetraethylene glycol.

In a preferred embodiment, the inner-salt-containing cosolvent of the present invention or the blend of the inner-salt-containing cosolvent and the conventional cosolvent comprise from approximately 20 weight % to approximately 25 weight % of an aqueous ink or fixer vehicle. Inks and fixers formulated with these cosolvents interact well with components such as pigments, surfactants and colorants normally used in aqueous inkjet inks or fixers.

To further illustrate the present invention, the following examples are given. It is to be understood that these examples are provided for illustrative purposes and are not to be construed as limiting the scope of the present invention.

EXAMPLES

Example 1

This example compares anti-curl qualities of Ammonium-N-Oxides and Betaine with conventional cosolvents. Specifically, 7"×9.5" images on 8.5"×11" sheets of Union Camp Great White paper (0.75" margins) were inkjet printed (10 6 pL Drops/300 dpi) with aqueous printing fluid containing 15 weight %, 20 weight % and 25 weight % of one of the following cosolvents: DiEthyleneGlycol, TetraEthyleneGlycol, TriMethylolPropane (EHPD), 2-Pyrrolidinone, N-MethylMorpholine-N-Oxide, N-EthylMorpholine-N-Oxide, N,N-DiMethylButylAmine-N-Oxide, N,N,N-TriMethylAmine-N-Oxide, and Betaine. To facilitate thermal inkjet printing and a uniform image, the following additional components were included: 0.75% Tergitol 15S7, a surfactant; 0.05% EDTA, a metal sequestrant; and 0.05% Acid Red 289, a trace magenta dye, to check image uniformity. These prints were allowed to dry unassisted at 23% relative humidity (RH) on a flat surface.

The curl of each sample was evaluated at 72 hours after printing. On Table 1 below, the curl of each sample was listed. With ambient drying, the curl of the worst edge rising above a flat surface was recorded in mm or, if the edge curled up and back toward the center of the paper, the curl was referred to as ">90". The description "Tube" was used when the curl resembled a scroll.

TABLE 1

| | Curl (mm) at 72 hr | | |
|---|---|---|---|
| Water/No Cosolvent/Control | tube | | |
| | % Loading | | |
| | 15% | 20% | 25% |
| DiEthylene Glycol | tube | tube | tube |
| TetraEthylene Glycol | >90 | 45 | 25 |
| EHPD | 35 | 18 | 14 |
| 2-P | tube | tube | tube |
| MeMorpholine-N-Oxide | 44 | 25 | 5 |
| EtMorpholine-N-Oxide | 40 | 20 | 5 |
| DiMeBuAmine-N-Oxide | 48 | 15 | 4 |
| TriMeAmine-N-Oxide | 35 | 7 | 1 |
| Betaine (N,N,N-Trimethyl glycinate) | 34 | 25 | 13 |

Example 2

This example compares anti-curl qualities of amino acids and Betaine with conventional cosolvents. Specifically, 7"×9.5" images on 8.5"×11" sheets of Union Camp Great White paper were inkjet printed (10 6 pL Drops/300 dpi) with aqueous printing fluid containing 15 weight %, 20 weight % and 25 weight % of one of the following cosolvents: 2-Pyrrolidinone, Glycerol, TetraEthyleneGlycol, 1,2-Hexanediol, Pyridine-N-Oxide, Betaine, α-Glycine, β-Alanine, and γ-AminoButyric Acid. To facilitate thermal inkjet printing and a uniform image, the following additional components were included: 0.75% Tergitol 15S7, a surfactant; 0.05% EDTA, a metal sequestrant; and 0.05% Acid Red 289, a trace magenta dye, to check deposit uniformity. Prints were allowed to dry unassisted at 35% RH on a flat surface.

The curl of each sample was evaluated at 72 hours after printing. On Table 2 below, the curl of each sample was listed in terms of mm curl, with curl in mm of worst edge rising above a flat surface with ambient drying. ">90" referred to the edge curling back toward the center of the paper. "Tube" referred to a scroll.

TABLE 2

| | Curl (mm) at 72 hr | | |
|---|---|---|---|
| Water Control | tube | | |
| | % Loading | | |
| CoSolvent | 15% | 20% | 25% |
| 2P | tube | Tube | tube |
| TetraEG | 32 | 36 | 28 |
| Glycerol | tube | Tube | tube |
| 1,2-Hexanediol | tube | Tube | tube |
| Pyridine-N-Oxide | tube | Tube | tube |
| Betaine(N,N,N-Trimethyl Glycinate) | 31 | 10 | 3 |
| α-Glycine | 41 | 31 | Solubility Limit |
| β-Alanine | 22 | 30 | 10 |
| γ-Aminobutyric acid | 32 | 26 | 2 |

Example 3

Curl data were collected for N-MethylMorpholine-N-Oxide and several other cosolvents at 15, 20, or 25% loading in aqueous inks also containing 0.75% Tergitol 15S7, 0.05% EDTA and 0.05% AR289 dye. These relatively pale inks (low colorant load) were printed on Union Camp Great White plain paper. These cosolvents were: Ethylene Glycol, Formamide, DiPropylene Glycol, 1,2-HexaneDiol, 2-Pyrrolidinone, DiEthylene Glycol, Sulfolane, 1,5-Pentanediol, TriEthylene Glycol, 1,6-Hexanediol, Glycerol, TriMethylolPropane (EthylHydroxymethylPropaneDiol), TetraEthylene Glycol and N-MethylMorpholine-N-Oxide. Data were gathered at 1 hour (Table 3a) and 72 hours (Table 3b). Literature values of the neat solvent vapor pressures (calculated for 25° C.) were quoted in mmHg. The curl of the imaged paper at 1 hour and 33% relative humidity (RH) and at 72 hrs and 43% RH was measured in millimeters (mm) of the height of the worst edge rising above a flat surface with non-assisted ambient drying. ">90" referred to the edge curling back toward the center of the paper. "Tube" referred to a scroll.

The data at 1 hour (Table 3a) below showed an improvement in 1 hr curl at vapor pressures below about $4 \times 10^{-2}$ mmHg, which could be the high vapor pressure preferred limit for "mixture solvents". Examination of the data for 72 hours (Table 3b) showed additional curl with time for the more volatile cosolvents and indicates that the more preferred solvents will have vapor pressures below $1 \times 10^{-4}$ mmHg.

TABLE 3a

| | Curl (mm) at 1 hr | | | |
|---|---|---|---|---|
| | Neat Vapor Press (25° C.) in mmHg | | | |
| Water Control | 25 | | | 40 |
| | | % Loading | | |
| CoSolvent | | 15% | 20% | 25% |
| | >4E-2 | | | |
| Ethylene Glycol | 9.2E-2 | tube | tube | tube |
| Formamide | 6.1E-2 | tube | tube | tube |
| | <4E-2 | | | |
| DiPropylene Glycol | 3.2E-2 | 50 | 50 | 22 |
| 1,2-Hexanediol | 2.0E-2 | tube | 55 | 55 |
| 2-Pyrrolidinone | 1.3E-2 | 46 | 40 | 45 |
| DiEthyleneGlycol | 5.6E-3 | >90 deg | 53 | 40 |
| Sulfolane | 5.1E-3 | 40 | >90 deg | 36 |
| 1,5-Pentanediol | 4.4E-3 | 40 | 49 | 29 |
| TriEthyleneGlycol | 1.3E-3 | 41 | 31 | 45 |
| 1,6-Hexanediol | 1.0E-3 | 34 | 35 | 22 |
| Glycerol | 1.7E-4 | 37 | 40 | 19 |
| | <1E-4 | | | |
| TriMethylolPropane | 9.5E-5 | 43 | 25 | 22 |
| TetraEthyleneGlycol | 6.2E-7 | 22 | 24 | 15 |
| N-MethylMorpholine-N-Oxide | Internal salt | 41 | 27 | 7 |

TABLE 3b

| | Curl (mm) at 72 hr | | | |
|---|---|---|---|---|
| | Neat Vapor Press (25° C.) in mmHg | | | |
| Water Control | 25 | | | tube |
| | | % Loading | | |
| CoSolvent | | 15% | 20% | 25% |
| | >4E-2 | | | |
| Ethylene Glycol | 9.2E-2 | tube | tube | tube |
| Formamide | 6.1E-2 | tube | tube | tube |
| | <4E-2 | | | |
| DiPropylene Glycol | 3.2E-2 | tube | tube | tube |
| 1,2-Hexanediol | 2.0E-2 | tube | tube | tube |
| 2-Pyrrolidinone | 1.3E-2 | >90 deg | tube | Tube |
| DiEthyleneGlycol | 5.6E-3 | tube | tube | tube |
| Sulfolane | 5.1E-3 | >90 deg | tube | tube |
| 1,5-Pentanediol | 4.4E-3 | tube | tube | tube |
| TriEthyleneGlycol | 1.3E-4 | 45 | 49 | 45 |
| 1,6-Hexanediol | 1.0E-4 | 48 | 53 | 52 |
| Glycerol | 1.7E-4 | tube | tube | tube |
| | <1E-4 | | | |
| TriMethylolPropane | 9.5E-5 | 40 | 22 | 23 |
| TetraEthyleneGlycol | 6.2E-7 | 32 | 36 | 38 |
| N-MethylMorpholine-N-Oxide | Internal salt | 41 | 24 | 6 |

Example 4

A fixer formulation commonly used in inkjet contained a cosolvent, an acidifying agent such as succinic acid (SA) and a cationic polymer mordant. The use of SA at pH 4 (near its first pKa) provided substantial acid capacity in the fixer, much like a true pH buffer. In this experiment MMNO was used as a replacement for the cosolvent in the fixer.

Preparation of the MMNO cosolvent based fixer formulations proceeded normally. Aqueous MMNO (15%) solutions as initially prepared were slightly alkaline. The MMNO was found to contain a trace of N-MethylMorpholine, "free amine" impurity, but MMNO was also found to be a weak base. The conjugate acid of MMNO, its protonated form, had a measured $pK_a$ of about 4.2. Thus, addition of 4% SA, which normally lowers the pH of "simple/unbuffered" cosolvents to pHs between 2 and 3, only lowered the measured pH down to about 5.1. The buffering capacity of the weak base, MMNO, limited the pH drop to 5.1, while providing substantial "acid capacity". Methanesulfonic acid was also used to lower the pH of the MMNO formulations to 5.1 and further down to 4.0. In addition to the buffering and anti-curl qualities that the MMNO imparts to the fixer formulations, these MMNO-containing fixer formulations had viscosity, decap and spit characteristics close to the original fixer formulations, using conventional solvents.

Example 5

N-EthylMorpholine-N-Oxide was synthesized according to a procedure described in Johnson, U.S. Pat. No. 1,144,048.

The oxidation of Ethyl Morpholine was done in a 500 ml 3-necked flask with a thermometer, condenser, equi-pressure addition funnel, magnetic stirrer, and temperature control, heating (heating mantle)/cooling (ice bath). EthylMorpholine (172.6 g) was placed into the flask and heated to 70° C. Hydrogen peroxide (145.7 g of 35%) was placed in the addition funnel. Since the oxidation exotherms near 70° C., the dropwise addition of $H_2O_2$ was very carefully adjusted to maintain a temperature near 70° C. Occasional use of the ice bath was needed to keep the reaction from overheating during the approximately 2 hours required for the addition. The reaction mix was kept at 70° C. (heating mantle) for 4 hours after completion of the addition. It was then allowed to stand overnight.

The reaction mix was then concentrated on a rotary evaporator (oil-less pump rated at 0.1 mm Hg and trap). Though the product did not drop out when acetone was added, the material finally solidified with time. The product was melted by heating it and triturated thoroughly with toluene to remove any free amine. The cooled solid was then pumped down in a vacuum oven. The solid product (N-EthylMorpholine-N-Oxide) was clean with about ½ mole water present.

Example 6

The synthesis of N,N-DiMethylButylAmmonium-N-Oxide was virtually the same as the synthesis of N-EthylMorpholine-N-Oxide set out in Example 5. N,N-DiMethylButylAmine (151.8 g) was placed in the flask and 145.7 g of 35% $H_2O_2$ was put in the addition funnel. After completion of the addition and 2 hours at 70° C., the mix was roto-evaporated using an oil-less pump. Water could only be removed very slowly. As a result, the product was collected as an aqueous solution that contains about 18% water.

Example 7

The effect of blending conventional polar, water-soluble co-solvents of differing neat solvent vapor pressures with zwitterionic anti-curl co-solvents was tested in dye-based and pigment-based aqueous inks by printing a 7"×9.5" uniform -area fill image on Union Camp Great White 8.5"×1" (plain paper) sheets at 10 (9 pL) drops/300 dpi. 2.5% AcidRed-52(AR52) magenta (sulforhodamine B) was the dye colorant for the dye based inks and 3.0% Cabojet 200 black pigment (a carbon black pigment from Cabot, Inc., Billerica, Mass.) was the pigment colorant for the pigment-based inks. The formulations all contained 0.75% Tergitol 15S7 and 0.05% $Na_2EDTA$. Two anti-curl cosolvents, 4-AminoButyric Acid (AmBuAcid) and N-Methyl-Morpholine-N-Oxide (MMNO) were selected as cosolvents (at 15% loading) for the dye-based and pigment-based inks respectively. At 15% loadings of the anti-curl agent, the curl of samples printed with this level of anti-curl agent was not fully suppressed. The contributions of inks containing 15% anti-curl solvent+additional cosolvents were compared to the 15% anti-curl controls. The calculated neat solvent vapor pressures of the additional cosolvents were also tabulated based upon literature data and associated formula and the selected temperature of 25° C. (See Chemical Properties Handbook http://www.knovel.com/knovel2/Toc.jsp?SpaceID=10093&BookID=49)

The dye-based ink comparisons using AmBuAcid anti-curl agent were collected in Table 7a. It was apparent that the curl can actually be made worse by blending a volatile cosolvent such as Ethylene Glycol (EG) with the anti-curl cosolvent. Generally, with 15% of the anticurl cosolvent, AmBuAcid, the curl position improved as the volatility of the blended 10% polar/H-bonding cosolvent is reduced. For cosolvents of modestly low volatility, such as 10% TriEthylene Glycol, compared to the control, the 1 hr curl was attenuated in a somewhat additive fashion (15% AmBuAcid+10% TEG) and the small adverse impact of the solvent volatility became noticeable at 72 hrs. For the essentially non-volatile cosolvents, the curl increases with extended dry time are barely noticeable (few mm).

In measuring the curl, the curl in mm was the height of the worst edge rising above a flat surface with ambient drying. ">90" referred to the edge curling back toward the center of the paper. "Tube" referred to a scroll.

TABLE 7a

| 10% Additional CoSolvent | Neat Vapor Pressure (25° C.) in mmHg | Curl in mm 1 Hr | Curl in mm 72 Hrs |
|---|---|---|---|
| Dye Based Inks with 15% β-AminoButyric Acid + 10% Additional Cosolvent ||||
| None | | 22 | 27 |
| 10% Ethylene Glycol | 9.2E−2 | 28 | 41 |
| 10% 2-Pyrrolidinone | 2.0E−2 | 14 | >90 |
| 10% TriEthyleneGlycol | 1.3E−3 | 9 | 27 |
| 10% TriEMethylolPropane | 9.5E−5 | 6 | 10 |
| 10% TetraEthyleneGlycol | 6.2E−7 | 5 | 13 |
| 10% 4-AminoButyric Acid | Internal Salt | 5 | 7 |
| Dye Based Inks with No Inner Salt, Just 10% "Additional" Cosolvent ||||
| 10% Water/Control | 2.4E+1 | 36 | 39 |
| 10% Ethylene Glycol | 9.2E−2 | >90 | >90 |
| 10% 2-Pyrrolidinone | 2.0E−2 | 37 | >90 |
| 10% TriEthyleneGlycol | 1.3E−3 | 26 | 33 |
| 10% TriMethylolPropane | 9.5E−5 | 18 | 18 |
| 10% TetraEthyleneGlycol | 6.2E−7 | >90 | 40 |
| 10% 4-AminoButyric Acid | Internal Salt | 31 | 33 |

The corresponding CABOJET 200 pigment based ink comparisons using 15% N-MethylMorpholine-N-Oxide (MMNO) anti-curl agent were collected in Table 7b. As with the dye based ink series, the incorporation of a modestly low volatility cosolvent, TriEthylene Glycol, yielded increasing curl with extended dry time from 7 mm at 1 hr to 18 mm at 72 hrs. There appeared to be some slow evaporation of cosolvent and migration out of the partially swollen cellulose, that manifests itself as delayed curl.

TABLE 7b

| 10% Additional CoSolvent | Neat Vapor Pressure (25° C.) in mm Hg | Curl in mm 1 Hr | Curl in mm 72 Hr |
|---|---|---|---|
| Pigmented Inks with 15% N-MethylMorpholine-N-Oxide + 10% Cosolvent ||||
| None | | 24 | 24 |
| 10% Ethylene Glycol | 9.2E−2 | 40 | >90 |
| 10% 2-Pyrrolidinone | 2.0E−2 | 11 | >90 |
| 10% TriEthyleneGlycol | 1.3E−3 | 7 | 18 |
| 10% TriMethylolPropane | 9.5E−5 | 10 | 10 |
| 10% TetraEthyleneGlycol | 6.2E−7 | 10 | 13 |
| 10% MMNO | Internal Salt | 4 | 5 |
| Pigmented Inks with No Inner Salt, Just 10% "Additional" Cosolvent ||||
| 10% Water | | 24 | >90 | >90 |
| 10% Ethylene Glycol | 9.2E−2 | tube | tube |
| 10% 2-Pyrrolidinone | 2.0E−2 | >90 | >90 |
| 10% TriEthyleneGlycol | 1.3E−3 | >90 | >90 |
| 10% TriMethylolPropane | 9.5E−5 | 26 | 30 |
| 10% TetraEthyleneGlycol | 6.2E−7 | 40 | >90 |

The AR-52 dye based inks with 15% 4-AminoButyric Acid incorporated as anti-curl agent were challenged with varying concentrations of the "relatively volatile" solvent Ethylene Glycol to determine the level at which its presence causes adverse changes in the paper curl. This data was collected in Table 7c. Examination of the 72 hr data in Table 7c clearly showed a deleterious effect even at Ethylene Glycol concentrations as low as 3%.

TABLE 7c

Curl With 15% 4-AminoButyric Acid + Varying Levels of Ethylene Glycol

| Additional CoSolvent | Neat Vapor Pressure (25° C.) in mm Hg | Curl in mm 1 Hr. | 24 Hrs. | 48 Hrs. | 72 Hrs. |
|---|---|---|---|---|---|
| 0% Ethylene Glycol | | 22 | 23 | 23 | 27 |
| 3% Ethylene Glycol | 9.2E−2 | 29 | 34 | 34 | 36 |
| 6% Ethylene Glycol | 9.2E−2 | 34 | 40 | 42 | 44 |
| 10% Ethylene Glycol | 9.2E−2 | 28 | 37 | 40 | 41 |
| 15% Ethylene Glycol | 9.2E−2 | >90 | >90 | >90 | tube |
| 10% 4-AminoButyric Acid | Internal Salt | 5 | 5 | 6 | 7 |

What is claimed is:

1. An aqueous fixer fluid for printing before or after an aqueous inkjet ink, the aqueous fixer comprising at least one anti-curl cosolvent, wherein the at least one anti-curl cosolvent comprises at least one inner salt compound having a $sp^3$-hybridized nitrogen cation and an associated anionic charge which is: isolated on an oxygen anion bound directly to the $sp^3$-hybridized nitrogen cation; or isolated among the oxygens of a carboxylate group,
wherein the at least one inner salt compound is an ammonium-N-oxide moiety, which when mixed with a strong acid gives ammonium-N-oxide conjugate acid with an approximate $pK_a$=4–5 and a buffering capacity in aqueous solution near pH=4–5.

2. The aqueous fixer fluid of claim 1, wherein the at least one anti-curl cosolvent forms a blended solution with at least one non-ionic, water-soluble blend cosolvent.

3. The aqueous fixer fluid of claim 2, wherein the at least one blend cosolvent has a neat solvent vapor pressure of no more than $4 \times 10^{-2}$ mm Hg and is capable of strong H-bonding interactions for disrupting fiber-to-fiber H-bonds in cellulose-based paper.

4. The aqueous fixer fluid of claim 3, wherein the at least one blend cosolvent has a neat solvent vapor pressure of no more than $1 \times 10^{-4}$.

5. The aqueous fixer fluid of claim 2, wherein the aqueous fixer fluid comprises from 5 to 60% of the blended solution of the at least one anti-curl cosolvent and the at least one blend cosolvent and the weight ratio of the inner salt anti-curl cosolvent(s) to blend cosolvent(s) in the blended solution ranges from 3:97 to 99:1.

6. The aqueous fixer fluid of claim 1, wherein the at least one inner salt compound comprises an ammonium N-oxide moiety with three alkyl groups attached to the nitrogen, and wherein each alkyl group independently comprises up to 6 carbons, each alkyl group being either a straight-chain, a branched chain, or a 5 to 7-membered ring comprising at least 4 carbons.

7. The aqueous fixer fluid of claim 6, wherein the 5 to 7-membered ring comprises at least one hetero atom selected from the group consisting of oxygen and nitrogen.

8. The aqueous fixer fluid of claim 7, wherein the 5 to 7-membered ring is a morpholine ring.

9. The aqueous fixer fluid of claim 6, wherein at least one of the three alkyl groups comprises at least one water-solubilizing substituent.

10. The aqueous fixer fluid of claim 9, wherein the at least one water-solubilizing substituent is selected from the group consisting of a hydroxyl group, a carbonyl group, an amide group, a sulfone group, a sulfoxide group, a polyethylene glycol moiety and an ammonium-N-oxide moiety.

11. The aqueous fixer fluid of claim 1, wherein the at least one inner salt compound is selected from the group consisting of N-MethylMorpholine-N-Oxide (MMNO); N-Ethyl-Morpholine-N-Oxide (EMNO); N,N-DiMethylButylAmmonium-N-Oxide (DMBANO) and N,N,N-TriMethylAmmonium-N-Oxide (TMANO).

12. The aqueous fixer fluid of claim 2, wherein the aqueous fixer fluid comprises at least 10 weight percent of the anti-curl cosolvent or the blended solution of the anti-curl cosolvent and the blend cosolvent.

13. The aqueous fixer fluid of claim 1, wherein the inkjet ink comprises pigment colorant.

14. The aqueous fixer fluid of claim 1, wherein the inkjet ink comprises dye colorant.

15. A method of using aqueous fixer fluid to avoid paper curl in printed paper, the method comprising:
  a) preparing an aqueous fixer fluid comprising at least one anti-curl cosolvent, wherein the at least one anti-curl cosolvent comprises at least one inner salt compound having a sp$^3$-hybridized nitrogen cation and an associated anionic charge which is either isolated on an oxygen anion bound directly to the sp$^3$-hybridized nitrogen cation or isolated among the oxygens of a carboxylate group;
  b) printing the paper with the aqueous fixer fluid;
  c) printing the paper with aqueous inkjet ink before or after printing the paper with the aqueous fixer fluid; and
  d) drying the aqueous fixer fluid onto the paper;
  wherein the at least one inner salt compound is an ammonium-N-oxide moiety, which when mixed with a strong acid gives ammonium-N-oxide conjugate acid with an approximate $pK_a=4-5$ and a buffering capacity in aqueous solution near pH=4–5.

16. The method of claim 15, wherein the at least one anti-curl cosolvent forms a blended solution with at least one non-ionic, water-soluble blend cosolvent.

17. The method of claim 16, wherein the at least one blend cosolvent has a neat solvent vapor pressure of no more than $4 \times 10^{-2}$ mmHg and is capable of strong H-bonding interactions for disrupting fiber-to-fiber H-bonds in cellulose-based paper.

18. The method of claim 17, wherein the at least one blend cosolvent has a neat solvent vapor pressure of no more than $1 \times 10^{-4}$ mmHg.

19. The method of claim 16, wherein the aqueous fixer fluid comprises from 5 to 60% of the blended solution of the at least one anti-curl cosolvent and the at least one blend cosolvent and the weight ratio of the inner salt anti-curl cosolvent(s) to blend cosolvent(s) in the blended solution ranges from 3:97 to 99:1.

20. The method of claim 15, wherein the at least one inner salt compound comprises an ammonium-N-oxide moiety with three alkyl groups attached to the nitrogen, and wherein each alkyl group independently comprises up to 6 carbons, each alkyl group being either a straight-chain, a branched chain, or a 5 to 7-membered ring comprising at least 4 carbons.

21. The method of claim 20, wherein the 5 to 7-membered ring comprises at least one hetero atom selected from the group consisting of oxygen and nitrogen.

22. The method of claim 21, wherein the 5 to 7-membered ring is a morpholine ring.

23. The method of claim 20, wherein at least one of the three alkyl groups comprises at least one water-solubilizing substituent.

24. The method of claim 22 wherein the at least one water-solubilizing substituent is selected from the group consisting of a hydroxyl group, an amide group, a carbonyl group, a sulfone group, a sulfoxide group, a polyethylene glycol moiety and an ammonium-N-oxide moiety.

25. The method of claim 15, wherein the at least one inner salt compound is selected from the group consisting of N-MethylMorpholine-Oxide (MMNO); N-EthylMorpholine-N-Oxide (EMNO); N,N-DiMethylButylAmmonium-Oxide (DMBANO) and N,N,N-TriMethylAmmonium-N-Oxide (TMANO).

26. The method of claim 16, wherein the aqueous fixer fluid comprises at least 10 weight percent of the anti-curl cosolvent or the blended solution of the anti-curl cosolvent and the blend cosolvent.

27. The method of claim 15, wherein the inkjet ink comprises pigment colorant.

28. The method of claim 15, wherein the inkjet ink comprises dye colorant.

29. A printer system for avoiding paper curl in printed papers, comprising:
  an aqueous fixer fluid depositing system including an aqueous fixer fluid and an aqueous inkjet ink, the aqueous fixer fluid comprising at least one anti-curl cosolvent, wherein the at least one anti-curl cosolvent comprises at least one inner salt compound having a sp$^3$-hybridized nitrogen cation and an associated anionic charge which is either isolated on an oxygen anion bound directly to the sp$^3$-hybridized nitrogen cation or isolated among the oxygens of a carboxylate group;

wherein the at least one inner salt compound is an ammonium-N-oxide moiety, which when mixed with a strong acid gives ammonium-N-oxide conjugate acid with an approximate $pK_a$=4–5 and a buffering capacity in aqueous solution near pH=4–5.

30. The printer system of claim 29, wherein the at least one anti-curl cosolvent forms a blended solution with at least one non-ionic, water-soluble blend cosolvent.

31. The printer system of claim 30, wherein the at least one blend cosolvent has a neat solvent vapor pressure of no more than $4\times10^{-2}$ mm Hg and is capable of strong H-bonding interactions for disrupting fiber-to-fiber H-bonds in cellulose-based paper.

32. The printer system of claim 31, wherein the at least one blend cosolvent has a neat solvent vapor pressure of no more than $1\times10^{-4}$.

33. The printer system of claim 30, wherein the aqueous fixer fluid comprises from 5 to 60% of blended solution of the at least one anti-curl cosolvent and the at least one blend co-solvent and the weight ratio of the inner salt anti-curl cosolvent(s) to blend cosolvent(s) in the blended solution ranges from 3:97 to 99:1.

34. The printer system of claim 29, wherein the at least one inner salt compound comprises an ammonium-N-oxide moiety with three alkyl groups attached to the nitrogen, and wherein each alkyl group independently comprises up to 6 carbons, each alkyl group being either a straight-chain, a branched chain, or a 5 to 7-membered ring comprising at least 4 carbons.

35. The printer system of claim 34, wherein the 5 to 7-membered ring comprises at least one hetero atom selected from the group consisting of oxygen and nitrogen.

36. The printer system of claim 35, wherein the 5 to 7-membered ring is a morpholine ring.

37. The printer system of claim 34, wherein at least one of the three alkyl groups comprises at least one water-solubilizing substituent.

38. The printer system of claim 37, wherein the at least one water solubilizing substituent is selected from the group consisting of a hydroxyl group, a carbonyl group, an amide group, a sulfone group, a sulfoxide group, a polyethylene glycol moiety and an ammonium-N-oxide moiety.

39. The printer system of claim 29, wherein the at least one inner salt compound is selected from the group consisting of N-MethylMorpholine-N-Oxide (MMNO); N-Ethyl-Morpholine-N-Oxide (EMNO); N,N-DiMethylButylAmmonium-N-Oxide (DMBANO) and N,N,N-TriMethylAmmonium-N-Oxide (TMANO).

40. The printer system of claim 30, wherein the aqueous fixer fluid comprises at least 10 weight percent of the anti-curl cosolvent or the blended solution of the anti-curl cosolvent and the blend cosolvent.

41. The printer system of claim 29, wherein the inkjet ink comprises pigment colorant.

42. The printer system of claim 29, wherein the inkjet ink comprises dye colorant.

* * * * *

UNITED STATES PATENT AND TRADEMARK OFFICE
CERTIFICATE OF CORRECTION

PATENT NO. : 7,377,972 B2 Page 1 of 1
APPLICATION NO. : 10/951411
DATED : May 27, 2008
INVENTOR(S) : Gary W Byers et al.

It is certified that error appears in the above-identified patent and that said Letters Patent is hereby corrected as shown below:

In column 13, line 19, in Claim 6, delete "ammonium N-oxide" and insert -- ammonium-N-oxide --, therefor.

In column 14, line 37, in Claim 24, delete "claim 22" and insert -- claim 23 --, therefor.

In column 14, line 57, in Claim 29, delete "papers," and insert -- paper, --, therefor.

Signed and Sealed this

Thirtieth Day of September, 2008

JON W. DUDAS
*Director of the United States Patent and Trademark Office*